(12) United States Patent
Maaniitty

(10) Patent No.: US 7,636,586 B2
(45) Date of Patent: Dec. 22, 2009

(54) MOBILE COMMUNICATION TERMINAL

(75) Inventor: Jussi Maaniitty, Vancouver (CA)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 11/249,026

(22) Filed: Oct. 12, 2005

(65) Prior Publication Data
US 2007/0082702 A1 Apr. 12, 2007

(51) Int. Cl.
H04B 1/38 (2006.01)
H04M 1/00 (2006.01)

(52) U.S. Cl. .......... 455/557; 455/502; 455/556.2; 455/419

(58) Field of Classification Search .......... 455/557, 455/502, 552.1, 503, 556.2, 414.1, 426.1, 455/67.11, 517, 41.1–41.2, 566, 552.2, 419, 455/420, 418; 715/810, 864, 853
See application file for complete search history.

(56) References Cited

U.S. PATENT DOCUMENTS

| 7,024,491 | B1 * | 4/2006 | Hanmann et al. | 709/248 |
| 7,263,350 | B2 * | 8/2007 | Kizu et al. | 455/414.1 |
| 2004/0056897 | A1 * | 3/2004 | Ueda | 345/779 |
| 2004/0223599 | A1 * | 11/2004 | Bear et al. | 379/207.02 |
| 2005/0192052 | A1 * | 9/2005 | Tenhunen | 455/557 |
| 2006/0019699 | A1 * | 1/2006 | Chang et al. | 455/552.1 |
| 2006/0023722 | A1 * | 2/2006 | Jung et al. | 370/395.4 |

OTHER PUBLICATIONS

User's Guide for Nokia PC Suite 6.6, 1997-2005 Nokia, pp. 1-27.

* cited by examiner

Primary Examiner—John Lee
(74) Attorney, Agent, or Firm—Perman & Green LLP

(57) ABSTRACT

It is presented a method for synchronizing theme parameters between a mobile terminal and a personal computer. The method comprises the steps of: detecting that a connection exists between the mobile terminal and the personal computer; sending a signal from the mobile terminal, the signal comprising at least one theme parameter; and modifying theme settings in at least one program on the personal computer to modify its appearance to correspond to at least one of the at least one theme parameter.

11 Claims, 4 Drawing Sheets

MOBILE COMMUNICATION TERMINAL

FIELD OF THE INVENTION

The present invention generally relates to mobile terminals and more particularly to improving personalization in the context of mobile terminals.

BACKGROUND OF THE INVENTION

Mobile terminals, or mobile (cellular) telephones, for mobile telecommunications systems like GSM, UMTS, D-AMPS and CDMA2000 have been used for many years now. In the older days, mobile terminals were used almost only for voice communication with other mobile terminals or stationary telephones. With added functionality, such as calendar/organizer/time planner, www/wap browsing, video telephony, electronic messaging (e.g. SMS, MMS, email, instant messaging), digital image or video recording, FM radio, music playback, electronic games, and word processing, mobile terminals are nowadays more like small computers.

With the improved user interface, including color screens, users have been given the ability to change the appearance of the user interface in the mobile terminal, typically as part of a theme. A theme is a collection of configuration settings affecting the user interface, such as background color and text color in a main screen area, title bar, etc. A background image may also be part of a theme. For example, one theme may be a theme for a particular football team and another theme may be a theme for the group "Outkast".

A key factor in making the experience of using mobile terminals as familiar as possible and still unique, is personalization. Themes allow personalization to some degree, but there is a general problem of how to enhance and improve personalization to make the user experience as pleasant and easy as possible.

SUMMARY OF THE INVENTION

In view of the above, an objective of the invention is to solve or at least reduce the problems discussed above.

Generally, the above objectives are achieved by the attached independent patent claims.

According to a first aspect of the invention there has been provided a method for synchronizing theme parameters between a mobile terminal and a personal computer, the method comprising the steps of: detecting that a connection exists between the mobile terminal and the personal computer; sending a signal from the mobile terminal, the signal comprising at least one theme parameter; and modifying theme settings in at least one program on the personal computer to modify its appearance to correspond to at least one of the at least one theme parameter. In other words, personalization using themes on the mobile terminal expand the impact by affecting themes on the personal computer, increasing the range of personalization.

The step of modifying theme settings may include modifying at least one program selected from a group consisting of a program for synchronizing data between the personal computer and the mobile terminal, a program for storing data from the mobile terminal on the personal computer, and a program for producing an appearance of the operating system of the personal computer. It is beneficial for mobile terminal related programs to benefit from the mobile terminal theme. Additionally, operating system themes have greater scope and create a larger impact.

The signal may comprise data representing text color and background color. The signal may further comprise textual data and binary data. The binary data may be selected from a group consisting of image data, audio data and video data. All these data types are beneficial when creating a theme and the signal is therefore capable of conveying these data types.

The method may be started automatically after a connection between the mobile terminal and the personal computer is established. This allows for simple and user friendly operation.

The connection may be a connection selected from a group consisting of a Bluetooth connection, an infrared connection, a Universal Serial Bus connection, a FireWire connection, a wireless local area network connection, RS-232 serial communication, a Wireless Universal Serial Bus connection, an Ethernet connection and a connection over the Internet. Any suitable connection type may be used in this invention.

The step of detecting that a connection exists may be performed in the mobile terminal, the step of sending a signal may be performed in the mobile terminal, and the step of modifying theme settings may be performed in the personal computer.

A second aspect of the invention is a mobile terminal capable of sending theme data to a personal computer, the mobile terminal comprising: means for detecting that a connection exists between the mobile terminal and the personal computer; and means for sending a signal from the mobile terminal, the signal comprising at least one theme parameter. In other words, personalization using themes on the mobile terminal expand the impact by affecting themes on the personal computer, increasing the range of personalization.

The signal may be adapted to be received by the personal computer and cause modification of theme settings in at least one program on the personal computer to modify its appearance to correspond to at least one of the at least one theme parameter.

A third aspect of the invention is a personal computer capable of receiving theme data from a mobile terminal, the personal computer comprising: means for detecting that a connection exists between the mobile terminal and the personal computer; and means for receiving a signal from the mobile terminal, the signal comprising at least one theme parameter. In other words, personalization using themes on the mobile terminal expand the impact by affecting themes on the personal computer, increasing the range of personalization.

The personal computer may further comprise means for modifying theme settings in at least one program on the personal computer to modify its appearance to correspond to at least one of the at least one theme parameter.

A fourth aspect of the invention is a system for exchanging theme data comprising a mobile terminal and a personal computer, the mobile terminal comprising: means for detecting that a connection exists between the mobile terminal and the personal computer; and means for sending a signal from the mobile terminal, the signal comprising at least one theme parameter; and the personal computer comprising: means for detecting that a connection exists between the mobile terminal and the personal computer; and means for receiving a signal from the mobile terminal, the signal comprising at least one theme parameter. In other words, personalization using themes on the mobile terminal expand the impact by affecting themes on the personal computer, increasing the range of personalization.

The personal computer may further comprise means for modifying theme settings in at least one program on the personal computer to modify its appearance to correspond to at least one of the at least one theme parameter.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF THE INVENTION

Figure 1:
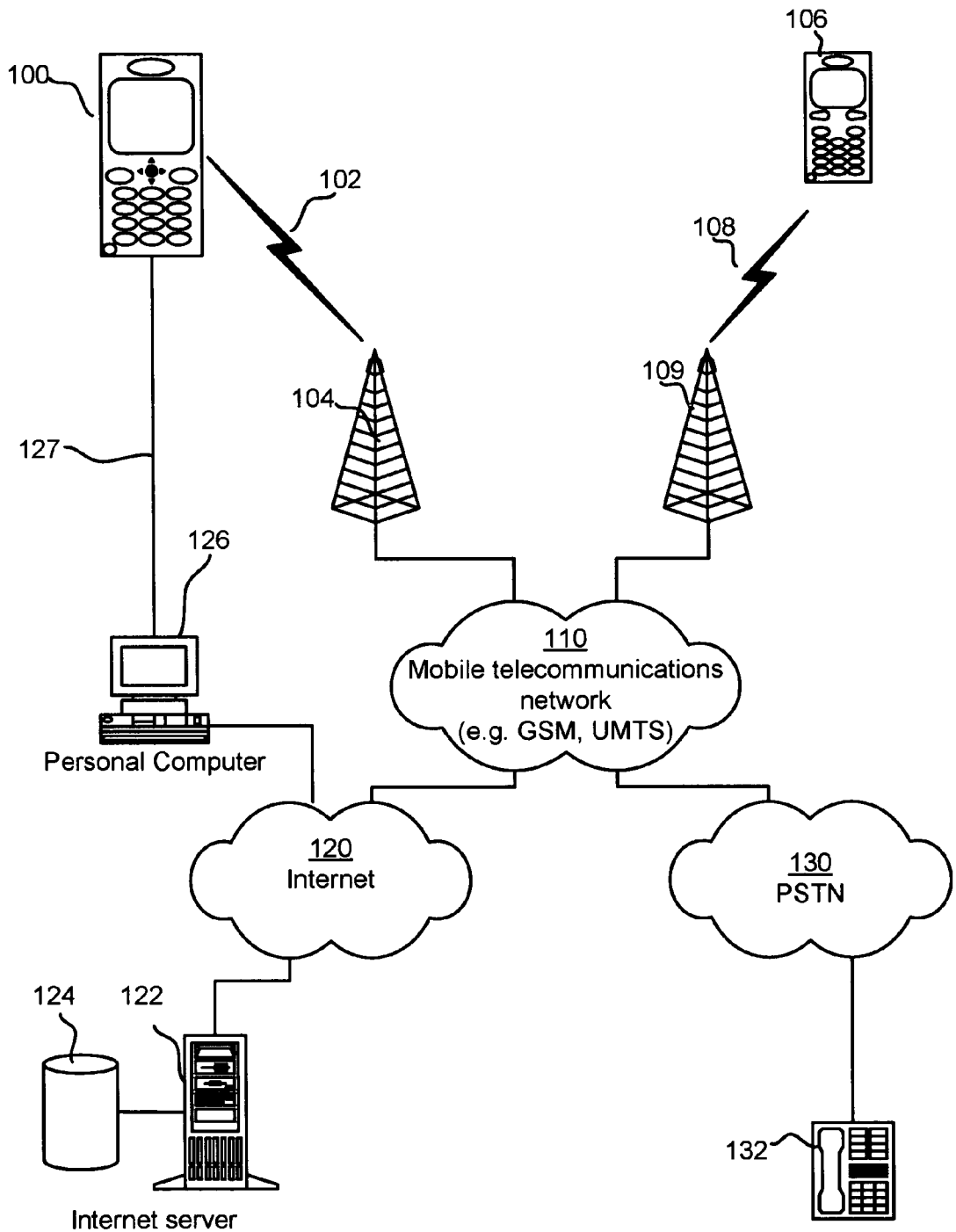
FIG. 1 is a schematic illustration of a cellular telecommunication system, as an example of an environment in which the present invention may be applied.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the present invention and other devices, such as another mobile terminal 106 or a stationary telephone 132. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120. The server 122 may host a www/wap server capable of serving www/wap content to the mobile terminal 100.

A personal computer 126 according to the present invention is also connected to the wide area network 120, and is further connected to the mobile terminal 100 via a local connection 127. The local connection 127 may be of any suitable type, be it a wireless connection such as Bluetooth, Infrared Data Association (IrDA), Wireless USB (WUSB), Wireless Local Area Network (WLAN), etc, or a wire-based connection such as USB, RS-232 serial communication, FireWire, Ethernet, etc. Typically, this local connection may be used to synchronize data such as contacts, calendar items, to-do items, and/or messages between the personal computer 126 and the mobile terminal 100. Also file items such as images and ring signals may be transferred over the local connection.

A public switched telephone network (PSTN) 130 is connected to the mobile telecommunications network 110 in a familiar manner. Various telephone terminals, including the stationary telephone 132, are connected to the PSTN 130.

Figure 2:
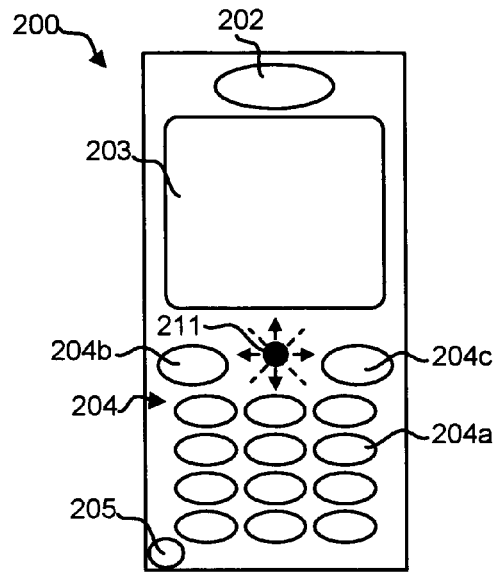
FIG. 2 is a schematic front view illustrating a mobile terminal according to an embodiment of the present invention.

An embodiment 200 of the mobile terminal 100 is illustrated in more detail in FIG. 2. The mobile terminal 200 comprises a speaker or earphone 202, a microphone 205, a display 203 and a set of keys 204 which may include a keypad 204a of common ITU-T type (alpha-numerical keypad representing characters "0"-"9", "*" and "#") and certain other keys such as soft keys 204b, 204c and a joystick 211.

Figure 3:
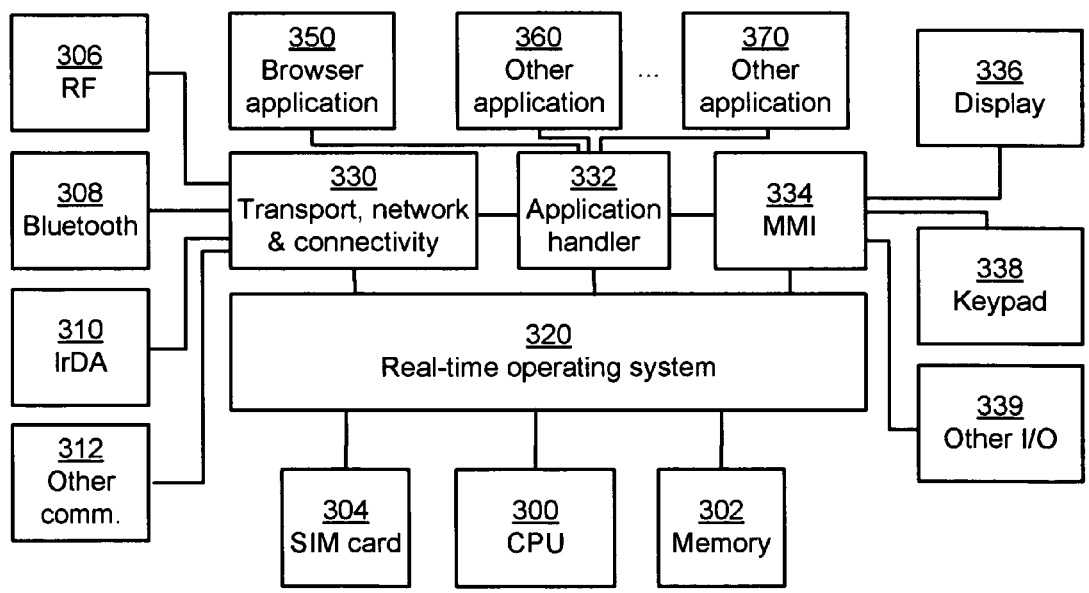
FIG. 3 is a schematic block diagram representing an internal component, software and protocol structure of the mobile terminal shown in FIG. 2.

The internal component and software structure of the mobile terminal 200 will now be described with reference to FIG. 3. The mobile terminal has a controller 300 which is responsible for the overall operation of the mobile terminal and is preferably implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data and program instructions for various software in the mobile terminal. The software includes a real-time operating system 320, drivers for a man-machine interface (MMI) 334, an application handler 332 as well as various applications. The applications include a browser application 350, as well as various other applications 360 and 370, such as applications for voice calling, video calling, sending SMS, MMS or email, an instant messaging application, a phone book application, a calendar application, a control panel application, a camera application, a media player, one or more video games, a notepad application, etc.

The MMI 334 also includes one or more hardware controllers, which together with the MMI drivers cooperate with the display 336/203, keypad 338/204 as well as various other I/O devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network, connectivity and synchronization). There is further an RF interface 306, and optionally a Bluetooth interface 308, an Infrared Data Association (IrDA) interface 310 and/or other local communication interfaces 312, such as USB, RS-232 serial communication, FireWire, Ethernet, Wireless Local Area Network (WLAN) and/or Wireless USB (WUSB). The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analog and digital electronic components, together forming a radio receiver and transmitter. These components include, i.a., band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4:
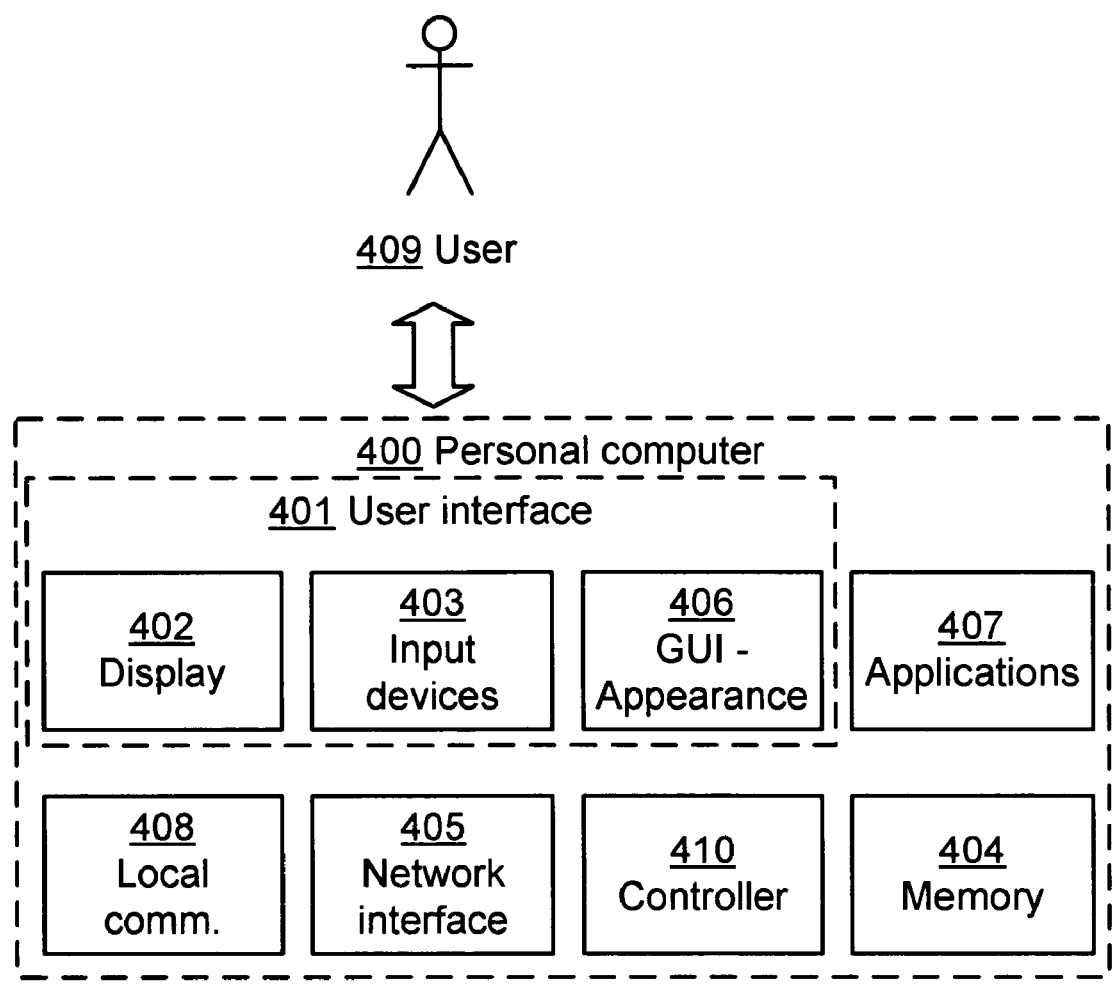
FIG. 4 is a schematic block diagram showing some key software and hardware components of the personal computer shown in FIG. 1.

FIG. 4 shows a personal computer 400 according to an embodiment of the invention, such as personal computer 126 in FIG. 1. The personal computer 400 has a controller 410 with associated memory 404. The controller is responsible for the overall operation of the personal computer 400 and may be implemented by any commercially available CPU (Central Processing Unit) or any other electronic programmable logic device. The associated memory may be internal and/or external to the controller 410 and may be RAM memory, ROM memory, EEPROM memory, flash memory, hard disk, or any combination thereof.

The memory 404 is used for various purposes by the controller 410, one of them being for storing data and program instructions for various pieces of software in the personal computer 400. The software includes an operating system, such as Microsoft Windows, Apple Mac OS, Linux, Unix, etc, and also includes drivers e.g. for a user interface 401 or local communication 408, as well as various applications 407.

Many if not all of these applications will interact with a user 409 both by receiving data input from him, such as text input through an input device 403, and by providing data output to him, such as visual output in the form of e.g. text and graphical information presented on a display 402. Non-limiting examples of applications are an Internet browser application, an email application, an organizer application including a calendar and contacts, a video game application, a calculator application, a word processing application, a spreadsheet application, a presentation application, a code memory application, a music player application, a media streaming application, and a control panel application. Only imagination sets the limit on what type of applications can run on the personal computer 400. GUI (graphical user interface) functionality 406 in the user interface 401 controls the interaction between the applications 407, the user 409 and the elements 402, 403 of the user interface 401. The GUI includes a program to control the operative environment and appearance of user interface elements using theme parameters. An application (or program) may be responsible for the operative environment, including implementing all theme parameters. The theme parameters may include wallpapers, colors of text and user interface elements, sounds and videos. Consequently, the user 409 may personalize the appearance according to the preferences of the user. Typically, the GUI functionality is part of, or closely related to, the operating system of the personal computer 400.

Text is typically input via a keyboard, and a mouse, trackball or touch sensitive screen is used to receive positional input from the user 409.

The personal computer 400 also typically has at least one interface 405 for access to network resources on at least one digital network, such as the wide area network 120 in FIG. 1. Means for local communication 408, such as adapters for Bluetooth, IrDA, USB, RS-232 serial communication, FireWire, Ethernet, Wireless Local Area Network (WLAN) and/or Wireless USB (WUSB), may also be connected to or be part of the personal computer 400. Consequently, the means for local communication 408 allows the personal computer 400 to establish a contact with a mobile terminal, such as mobile terminal 100 in FIG. 1, in the proximity of the personal computer 400. Typically, this type of local connection is used to synchronize data such as contacts, calendar items, to-do items, and/or messages between the personal computer 400 and the mobile terminal 100. Moreover, file items such as images and ring signals may be transferred over the local connection.

Figure 5:
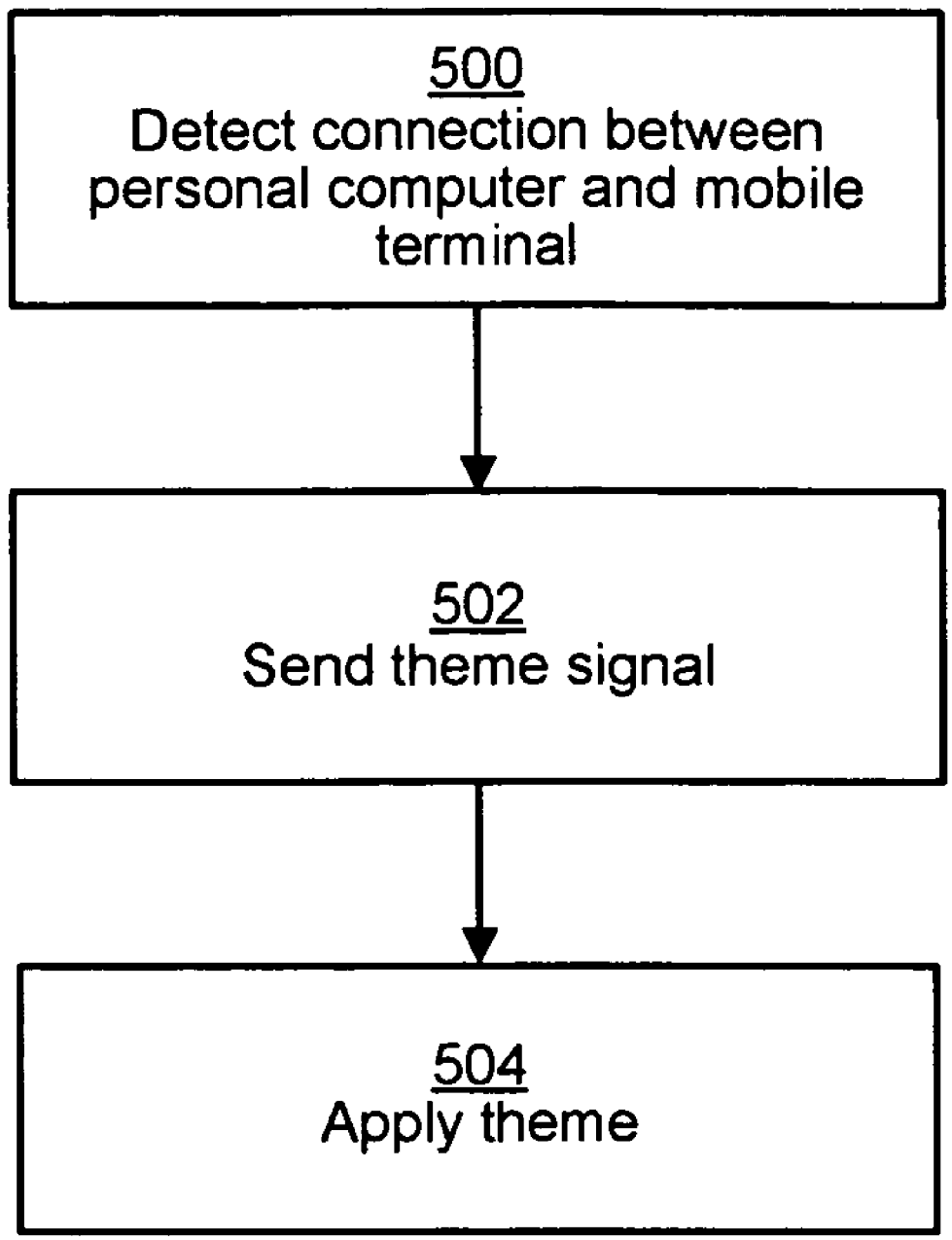
FIG. 5 is a flowchart diagram that illustrates the operation of a method according to the present invention.

With reference to FIG. 5, a method involving the mobile terminal 100 and personal computer 126 for exchanging theme data according to an embodiment of the invention will now be described. In general, a theme from the mobile terminal 100 is to be transferred and applied to the personal computer 126. The method may be triggered manually, either on the personal computer 126 or the mobile terminal 100, or the method may be configured to start automatically as soon as a connection between the mobile terminal 100 and the personal computer 126 is present.

In step 500, the presence of a connection is detected. This step may be performed in either the mobile terminal 100 or the personal computer 126. The invention is not limited to use of a particular type of connection; any type of suitable connection between the personal computer 126 and the mobile terminal 100 is consistent with the present invention, such as the local connection types previously mentioned or a connection over the Internet.

A signal is then sent from the mobile terminal 100 to the personal computer 126 in step 502. The signal contains theme parameters, and can be a separate theme signal or may be incorporated in a signal having a wider use. The theme parameters included may for example relate to color of backgrounds or text for several contexts. Images may also be transmitted, to form part of a background (also known as wallpapers), title decorations, etc., as well as audio and/or video to be included in the theme. Moreover, applications may also be transmitted in this step. For example, if the user has a football theme on the mobile terminal 100 that should be transmitted to the personal computer 126, applications providing recent football news, results or easy access to team info, etc. could be transmitted. In one embodiment, in this step the phone may first check what theme is currently active in the personal computer 126, and only push the theme by sending the signal if the theme to be sent is not the theme currently active in the personal computer 126. The currently active theme in the personal computer 126 may for example be determined by checking a name of the currently active theme, a theme id, or by checking individual theme components. If it is determined that the theme signal should not be sent, the method ends immediately.

The theme is then applied in step 504. Depending on how much of the GUI of the personal computer 126 is to be personalized according to the theme of the mobile terminal 100, different combination of programs on the personal computer 126 may be affected. For example, in one embodiment, only applications related to the mobile terminal are affected, such as a program for synchronizing data between the personal computer 126 and the mobile terminal, and a program for storing data from the mobile terminal on the personal computer 126. In other words, once this method has been executed, the affected programs have a theme corresponding to the current theme in the mobile terminal. In another embodiment, the appearance of the whole operating system is affected, to be the same as the theme of the mobile terminal 100. The user may be able to configure different degrees of personalization to be affected. Optionally, it may be determined by parameters in the theme itself how much personalization should be affected in the personal computer 126.

In case the theme parameters provided in the signal are not sufficient to exactly match each required theme parameter for the personal computer program, the missing parameters are set to a value derived from a parameter or parameters in the signal yielding an acceptable end result or to a default value.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for synchronizing theme parameters between a mobile terminal and a personal computer, said method comprising:
    detecting that a connection exists between said mobile terminal and said personal computer;
    sending a signal from said mobile terminal, said signal comprising at least one theme parameter; and
    modifying theme settings in at least one program on said personal computer to modify its appearance to correspond to at least one of said at least one theme parameter, wherein a theme is the appearance, including color and configuration, of material displayed on a screen area.

2. The method according to claim 1, wherein said modifying of theme settings includes modifying at least one program selected from a group consisting of a program for synchronizing data between said personal computer and said mobile terminal, a program for storing data from said mobile terminal on said personal computer, and a program for producing an appearance of the operating system of said personal computer.

3. The method according to claim 1, wherein said signal comprises data representing text color and background color.

4. The method according to claim 1, wherein said signal comprises textual data and binary data.

5. The method according to claim 4, wherein said binary data is selected from a group consisting of image data, audio data and video data.

6. The method according to claim 1, wherein said method is started automatically after a connection between said mobile terminal and said personal computer is established.

7. The method according to claim 1, wherein said connection is a connection selected from a group consisting of a Bluetooth connection, an infrared connection, a Universal Serial Bus connection, a FireWire connection, a wireless local area network connection, RS-232 serial communication, a Wireless Universal Serial Bus connection, an Ethernet connection and a connection over the Internet.

8. The method according to claim 1, wherein
    said detecting that a connection exists is performed in said mobile terminal,
    said sending of a signal is performed in said mobile terminal, and
    said modifying of theme settings is performed in said personal computer.

9. A mobile terminal capable of sending theme data to a personal computer, said mobile terminal comprising:
    means for detecting that a connection exists between said mobile terminal and said personal computer;
    means for sending a signal from said mobile terminal, said signal comprising at least one theme parameter, wherein a theme is the appearance, including color and configuration, of material displayed on a screen area; and
    means responsive to a program on said computer for modifying theme settings in said program to modify its appearance to correspond to said at least one theme parameter.

10. A personal computer capable of receiving theme data from a mobile terminal, said personal computer comprising:
    means for detecting that a connection exists between said mobile terminal and said personal computer;
    means for receiving a signal from said mobile terminal, said signal comprising at least one theme parameter, wherein a theme is the appearance, including color and configuration, of material displayed on a screen area; and
    means responsive to a program on said computer for modifying theme settings in said program to modify its appearance to correspond to said at least one theme parameter.

11. A system for exchanging theme data, comprising
a mobile terminal and a personal computer, said mobile terminal comprising:
means for detecting that a connection exists between said mobile terminal and said personal computer; and
means for sending a signal from said mobile terminal, said signal comprising at least one theme parameter;
and said personal computer comprising:
means for detecting that a connection exists between said mobile terminal and said personal computer;
means for receiving a signal from said mobile terminal, said signal comprising at least one theme parameter, wherein a theme is the appearance, including color and configuration, of material displayed on a screen area; and
means responsive to a program on said computer for modifying theme settings in said program to modify its appearance to correspond to said at least one theme parameter.

* * * * *

UNITED STATES PATENT AND TRADEMARK OFFICE
CERTIFICATE OF CORRECTION

PATENT NO. : 7,636,586 B2 Page 1 of 1
APPLICATION NO. : 11/249026
DATED : December 22, 2009
INVENTOR(S) : Maaniitty It is certified that error appears in the above-identified patent and that said Letters Patent is hereby corrected as shown below:

On the title page, column 1, line 1, item (75); delete "Vancouver (CA)" and insert --Viiala (FI)-- therefor.

Signed and Sealed this

Thirteenth Day of July, 2010

David J. Kappos
*Director of the United States Patent and Trademark Office*